United States Patent
Qiang et al.

(10) Patent No.: US 12,355,530 B2
(45) Date of Patent: Jul. 8, 2025

(54) DUAL CODEBOOK CONFIGURATION AND CSI COMBINING FOR LARGE SCALE ACTIVE ANTENNA SYSTEMS

(71) Applicant: Telefonaktiebolaget LM Ericsson (publ), Stockholm (SE)

(72) Inventors: Yongquan Qiang, Ottawa (CA); Hong Ren, Kanata (CA); Jianguo Long, Ottawa (CA); Wei Wang, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 128 days.

(21) Appl. No.: 18/252,227

(22) PCT Filed: Dec. 11, 2020

(86) PCT No.: PCT/IB2020/061844
§ 371 (c)(1),
(2) Date: May 9, 2023

(87) PCT Pub. No.: WO2022/123300
PCT Pub. Date: Jun. 16, 2022

(65) Prior Publication Data
US 2024/0014872 A1    Jan. 11, 2024

(51) Int. Cl.
*H04B 7/06*      (2006.01)
*H04B 7/0456*    (2017.01)

(52) U.S. Cl.
CPC ......... *H04B 7/0626* (2013.01); *H04B 7/0486* (2013.01)

(58) Field of Classification Search
CPC ........................... H04B 7/0626; H04B 7/0486
See application file for complete search history.

(56) References Cited

U.S. PATENT DOCUMENTS

| 10,050,754 | B2 | 8/2018 | Li et al. |
| 2013/0308715 | A1 | 11/2013 | Name et al. |
| 2014/0079100 | A1 | 3/2014 | Kim et al. |
| 2017/0134130 | A1* | 5/2017 | Li ........................ H04L 5/0057 |

OTHER PUBLICATIONS

International Search Report and Written Opinion dated Aug. 24, 2021 issued in PCT Application No. PCT/IB2020/061844 filed Dec. 11, 2020, consisting of 14 pages.
(Continued)

*Primary Examiner* — Vineeta S Panwalkar
(74) *Attorney, Agent, or Firm* — Weisberg I.P Law, P.A.

(57) ABSTRACT

A method, network node and wireless device (WD) for dual codebook configuration and channel state information (CSI) combining for large scale active antenna systems (AAS) are disclosed. According to one aspect, a method in a network node includes triggering the WD to transmit in succession or simultaneously, a horizontal CSI report reporting a horizontal CSI set for a horizontal direction of the array and a vertical CSI report reporting a vertical CSI set for a vertical direction of the array, the horizontal CSI set being mapped to a row of the array and the vertical CSI set being mapped to a column of the array. The method also includes receiving the horizontal and vertical CSI reports from the WD, and combining the horizontal and vertical CSI sets into a combined CSI set for at least one of scheduling and beamforming.

26 Claims, 10 Drawing Sheets

(56) References Cited

OTHER PUBLICATIONS

3GPP TSG-RAN WG1 #66; R1-112420; Source: Alcatel-Lucent Shanghai Bell, Alcatel-Lucent; Title: Considerations on CSI feedback enhancements for high-priority antenna configurations; Agenda Item: 6.6.2.1; Document for: Discussion/decision, Athens, Greece, Aug. 22-26, 2011, consisting of 7 pages.

3GPP TS 38.214 V15.4.0 (Dec. 2018) 3rd Generation Partnership Project; Technical Specification Group Radio Access Network; NR; Physical layer procedures for data (Release 15), consisting of 102 pages.

3GPP TS 38.331 V15.4.0 (Dec. 2018) 3rd Generation Partnership Project; Technical Specification Group Radio Access Network; NR; Radio Resource Control (RRC) protocol specification (Release 15), consisting of 474 pages.

\* cited by examiner

DUAL CODEBOOK CONFIGURATION AND CSI COMBINING FOR LARGE SCALE ACTIVE ANTENNA SYSTEMS

CROSS-REFERENCE TO RELATED APPLICATION

This application is a Submission Under 35 U.S.C. § 371 for U.S. National Stage Patent Application of International Application Number: PCT/IB2020/061844, filed Dec. 11, 2020 entitled "DUAL CODEBOOK CONFIGURATION AND CSI COMBINING FOR LARGE SCALE ACTIVE ANTENNA SYSTEMS," the entirety of which is incorporated herein by reference.

TECHNICAL FIELD

This disclosure relates to wireless communication and in particular, to dual codebook configuration and channel state information (CSI) combining for large scale active antenna systems (AAS).

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

Active antenna systems (AAS) are key technologies adopted by 4G LTE and 5G NR to enhance wireless network performance and capacity by using full dimension multiple input multiple output (FD-MIMO) and massive MIMO. A typical AAS system consists of a two-dimensional antenna array with N columns, and M rows and two polarizations as shown in FIG. 1.

In 3GPP Technical Release 15 (Rel-15) for NR, "TypeI-SinglePanel" codebook with a configuration of ($N_1$, $N_2$) is introduced for two-dimensional antenna arrays, with $N_1$ antenna ports in the horizontal direction and $N_2$ antenna ports in the vertical direction with cross-polarization as shown in FIG. 2. The associated non-zero power (NZP) channel state information reference signal (CSI-RS) resource is configured for channel measurement with a number of a CSI-RS ports given by $P_{CSI-RS}=2N_1N_2$.

Two types of codebooks are defined by the 3GPP:
Full antenna ports codebook for ½ layer of $P_{CSI-RS}$<16; and
Antenna ports grouping for ¾ layer and $P_{CSI-RS}$≥16.

For the full antenna ports codebook, used when the number of CSI-RS ports is less than 16, codebook modes for the indicated number of layers include the following.

| 1 layer codebookMode = 1 | | | |
|---|---|---|---|
| $i_{1,1}$ | $i_{1,2}$ | $i_2$ | |
| 0, 1, ..., $N_1O_1$ − 1 | 0, ..., $N_2O_2$ − 1 | 0, 1, 2, 3 | $W^{(1)}_{i_{1,1},i_{1,2},i_2}$ | where $W^{(1)}_{l,m,n} = \frac{1}{\sqrt{P_{CSI-RS}}} \begin{bmatrix} v_{l,m} \\ \varphi_n v_{l,m} \end{bmatrix}$.

| 2 layer codebookMode = 1 | | | |
|---|---|---|---|
| $i_{1,1}$ | $i_{1,2}$ | $i_2$ | |
| 0, 1, ..., $N_1O_1$ − 1 | 0, ..., $N_2O_2$ − 1 | 0, 1 | $W^{(2)}_{i_{1,1},i_{1,1}+k_1,i_{1,2},i_{1,2}+k_2,i_2}$ | where $W^{(2)}_{l,l',m,m',n} = \frac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$.

and the mapping from $i_{1,3}$ to $k_1$ and $k_2$ is given in Table 5.2.2.2.1-3 of 3GPP Technical Standard (TS) 38.214 V15.4.0.

| 3 layer codebookMode = 1-2, $P_{CSI-RS}$ < 16 | | | |
|---|---|---|---|
| $i_{1,1}$ | $i_{1,2}$ | $i_2$ | |
| 0, ..., $N_1O_1$ − 1 | 0, 1, ..., $N_2O_2$ − 1 | 0, 1 | $W^{(3)}_{i_{1,1},i_{1,1}+k_1,i_{1,2},i_{1,2}+k_2,i_2}$ | where $W^{(3)}_{l,l',m,m',n} = \frac{1}{\sqrt{3P_{CSI-RS}}} \begin{bmatrix} v_{l,m} & v_{l',m'} & v_{l,m} \\ \varphi_n v_{l,m} & \varphi_n v_{l',m'} & -\varphi_n v_{l,m} \end{bmatrix}$.

and the mapping from $i_{1,3}$ to $k_1$ and $k_2$ is given in Table 5.2.2.2.1-4 of 3GPP TS 38.214 V15.4.0.

| 4 layer codebookMode = 1-2, $P_{CSI-RS}$ < 16 | | | |
|---|---|---|---|
| $i_{1,1}$ | $i_{1,2}$ | $i_2$ | |
| 0, ..., $N_1O_1$ − 1 | 0, 1, ..., $N_2O_2$ − 1 | 0, 1 | $W^{(4)}_{i_{1,1},i_{1,1}+k_1,i_{1,2},i_{1,2}+k_2,i_2}$ | where $W^{(4)}_{l,l',m,m',n} = \frac{1}{\sqrt{4P_{CSI-RS}}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$.

and the mapping from $i_{1,3}$ to $k_1$ and $k_2$ is given in Table 5.2.2.2.1-4 of 3GPP TS 38.214 V15.4.0.

In these tables, $O_1$, $O_2$ are the oversampling rates for beams in the horizontal and vertical directions, respectively. The beam formed by an oversampled discrete Fourier transform vector with all available antenna ports in the horizontal and vertical directions may be expressed as:

$$v_{l,m} = v_l \otimes v_m$$

where $v_l$ and $v_m$ denote horizontal and vertical beams formed by over-sampled DFT vectors with all available antenna ports in the horizontal and vertical directions. These beams (or DFT vectors) may be expressed by $$v_l = \left[1, e^{\frac{j2\pi l}{N_1 O_1}}, ..., e^{\frac{j2\pi(N_1-1)l}{N_1 O_1}}\right]^T, \quad l = 0, 1, ..., N_1 O_1 - 1$$

$$v_m = \left[1, e^{\frac{j2\pi m}{N_2 O_2}}, ..., e^{\frac{j2\pi(N_2-1)m}{N_2 O_2}}\right]^T, \quad m = 0, 1, ..., N_2 O_2 - 1$$

(l,m) and (l', m') are beam indices in the horizontal and vertical direction, which can be determined from the precoder matric indicator (PMI) ($i_{1,1}$, $i_{1,2}$, $i_{1,3}$, $i_2$) reported by the WD, which is denoted by $$l = i_{1,1}$$

$$m = i_{1,2}$$

$$l' = \mod(i_{1,1} + k_1, N_1 O_1)$$

$$m' = \mod(i_{1,2} + k_2, N_2 O_2)$$

$k_1$ and $k_2$ are determined according to the $i_{1,3}$ to $k_1$ and $k_2$ mapping table of 5.2.2.2.1-3/4 defined in 3GPP TS 38.214 V15.4.0. The co-phasing factor, $\varphi_n$, between two polarizations is determined by the WD-reported co-phasing index $i_2$, denoted by $$\varphi_n = e^{j\pi n/2}, \; n = i_2$$

For the antenna ports grouping codebook, used when the number of CSI-RS ports is greater than or equal to 16, codebook modes for the indicated number of layers include the following.

| 3 layer codebookMode = 1-2, $P_{CSI-RS} \geq 16$ | | | |
|---|---|---|---|
| $i_{1,1}$ | $i_{1,2}$ | $i_{1,3}$ | $i_2$ |
| $0, \ldots, \frac{N_1 O_1}{2} - 1$ | $0, \ldots, N_2 O_2 - 1$ | 0, 1, 2, 3 | 0, 1 | $W^{(3)}_{i_{1,1}, i_{1,2}, i_{1,3}, i_2}$ | where $W^{(3)}_{l,m,p,n} = \frac{1}{\sqrt{3 P_{CSI-RS}}} \begin{bmatrix} \tilde{v}_{l,m} & \tilde{v}_{l,m} & \tilde{v}_{l,m} \\ \theta_p \tilde{v}_{l,m} & -\theta_p \tilde{v}_{l,m} & \theta_p \tilde{v}_{l,m} \\ \varphi_n \tilde{v}_{l,m} & \varphi_n \tilde{v}_{l,m} & -\varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} \end{bmatrix}$.

| 4 layer codebookMode = 1-2, $P_{CSI-RS} \geq 16$ | | | |
|---|---|---|---|
| $i_{1,1}$ | $i_{1,2}$ | $i_{1,3}$ | $i_2$ |
| $0, \ldots, \frac{N_1 O_1}{2} - 1$ | $0, \ldots, N_2 O_2 - 1$ | 0, 1, 2, 3 | 0, 1 | $W^{(4)}_{i_{1,1}, i_{1,2}, i_{1,3}, i_2}$ | where $W^{(4)}_{l,m,p,n} = \frac{1}{\sqrt{4 P_{CSI-RS}}} \begin{bmatrix} \tilde{v}_{l,m} & \tilde{v}_{l,m} & \tilde{v}_{l,m} & \tilde{v}_{l,m} \\ \theta_p \tilde{v}_{l,m} & -\theta_p \tilde{v}_{l,m} & \theta_p \tilde{v}_{l,m} & -\theta_p \tilde{v}_{l,m} \\ \varphi_n \tilde{v}_{l,m} & \varphi_n \tilde{v}_{l,m} & -\varphi_n \tilde{v}_{l,m} & -\varphi_n \tilde{v}_{l,m} \\ \varphi_n \theta_p \tilde{v}_{l,m} & -\varphi_n \theta_p \tilde{v}_{l,m} & -\varphi_n \theta_p \tilde{v}_{l,m} & \varphi_n \theta_p \tilde{v}_{l,m} \end{bmatrix}$.

where $$\tilde{v}_{l,m} = \tilde{v}_l \otimes v_m$$

and where $\tilde{v}_l$ is the horizontal beam formed by an oversampled DFT vector with half of antenna ports of in the horizontal direction, expressed by:

$$\tilde{v}_l = \left[ 1, e^{\frac{j 4 \pi l}{N_1 O_1}}, \ldots, e^{\frac{j 4 \pi (N_1/2 - 1) l}{N_1 O_1}} \right]^T, \; l = 0, 1, \ldots, N_1 O_1 / 2 - 1$$

The vertical beam ($v_m$) for 3-layer and 4-layer with $P_{CSI-RS} \geq 16$ are formed in the same way as that of the codebook with $P_{CSI-RS} < 16$. The indices, (l,m), are determined from the WD-reported PMI ($i_{1,1}$, $i_{1,2}$, $i_{1,3}$, $i_2$), denoted by $$l = i_{1,1}$$

$$m = i_{1,2}$$

$\theta_p$ is the co-phasing factor between two antenna port groups determined by WD reported inter-group co-phasing index $i_{1,3}$, denoted by $$\theta_p = e^{j\pi p/4}, \; p = i_{1,3}$$

Where $\varphi_n$ is co-phasing factor between two polarizations determined by WD reported inter-polarization co-phasing index $i_2$ as same as that of codebook with $P_{CSI-RS} < 16$.

Usually, in a large scale AAS, the number of antenna elements of 2MN are far larger than number of antenna ports of $2N_1 N_2$ supported by current 3GPP specifications, especially, in high-band AAS. In current NR specifications (3GPP Technical Release 15 and Technical Release 16), up to 32 CSI-RS ports are supported as shown in the table below.

| Number of CSI-RS antenna ports, $P_{CSI-RS}$ | $(N_1, N_2)$ | $(O_1, O_2)$ |
|---|---|---|
| 4 | (2, 1) | (4, 1) |
| 8 | (2, 2) | (4, 4) |
|   | (4, 1) | (4, 1) |
| 12 | (3, 2) | (4, 4) |
|    | (6, 1) | (4, 1) |
| 16 | (4, 2) | (4, 4) |
|    | (8, 1) | (4, 1) |
| 24 | (4, 3) | (4, 4) |
|    | (6, 2) | (4, 4) |
|    | (12, 1) | (4, 1) |
| 32 | (4, 4) | (4, 4) |
|    | (8, 2) | (4, 4) |
|    | (16, 1) | (4, 1) |

In an earlier phase of deployment of NR, up to 8 CSI-RS ports are supported by some vendors.

Existing approaches to implement NR "Type1-SinglePanel" code book in a large scale AAS include port-to-antenna mapping. To support a smaller number of CSI-RS ports in a large scale AAS, one of the existing approaches is to apply a port-to-antenna mapping, by which one CSI-RS port is mapped to multiple antenna elements as shown in the example of FIG. 3.

The final beamforming weight then can be expressed by $$W = W_{p2a} W_{PMI}$$

where $W_{p2a}$ is a port-to-antenna mapping matrix with dimension of $N_t \times P_{CSI-RS}$, and $N_t = 2 \times M \times N$.

Furthermore, a cell may be split into multiple virtual sectors by configuring multiple CSI-RS resources and applying port-to-antenna mapping matrix for each CSI-RS resource to cover a corresponding sector.

A problem of existing solutions is that the beam radiation pattern of DFT beams is distorted by port-to-antenna mapping. As a result, the cell/sector coverage is the envelope of port-to-antenna mapping matrix as shown in FIG. 4. The darker curves A are final beam radiation patterns in a first virtual sector. The lighter curves B are final beam patterns in a second virtual sector. The curves show that with a single CSI-RS resource without sectorization, the cell coverage is reduced significantly with an obvious coverage hole between −40 and −20 degrees and between 20 and 40 degrees. The curves also show that with multiple CSI-RS resources and sectorization, there is still up to 3 dB power loss from boresight at the cell edges. Further, the curves show inter-sector interference.

SUMMARY

Some embodiments advantageously provide a method and system for dual codebook configuration and channel state information (CSI) combining for large scale active antenna systems (AAS).

Some embodiments include a method of dual CSI-RS and codebook configuration and CSI combining for large-scale AAS. This may include at the base station (for example, a gNB):

Configuring a WD with two separated "TypeI-SinglePanel" codebooks and corresponding CSI-RS resources, one for the horizontal direction and another one for the vertical direction;
Obtaining two sets of CSI reports for the two configured codebook, respectively;
Combining the two sets of CSI into a single CSI; and/or
Performing DL transmissions with the combined CSI.

Some embodiments support "Type-I" codebook-based beamforming for large-scale AAS and may achieve high beamforming gain. Some embodiments may include one or more of the following advantages:

Larger number of antenna ports:
In current 3GPP specifications, the AAS can support up to 32 CSI-RS antenna ports. With dual CSI-RS and codebook configurations, it equivalently extends the antennas ports up to 512, which helps to achieve high beamforming gain;
Less CSI-RS overhead:
For example, for AAS with 64 antenna elements (8×4× 2) to form two virtual sectors, traditionally, two 32-port CSI-RS resources are configured, using 32+32=64 resource elements (REs) in total. With dual CSI-RS and codebook configurations of (8,1) and (4,1), as few as 16+8=24 REs may be needed; and
Refined beam radiation pattern and cell coverage:
With dual CSI-RS and codebook configurations, a one-to-one CSI-RS port-to-antenna mapping can be applied, which helps to refine beam radiation pattern and cell coverage.

According to one aspect, a method in a network node in communication with a wireless device (WD) is provided. The network node has an array of antenna elements and a number of channel state information reference signal (CSI-RS) ports. The method includes triggering the WD to transmit in succession or simultaneously, a horizontal CSI report reporting a horizontal CSI set for a horizontal direction of the array and a vertical CSI report reporting a vertical CSI set for a vertical direction of the array, the horizontal CSI set being mapped to a row of the array and the vertical CSI set being mapped to a column of the array. The method also includes receiving the horizontal and vertical CSI reports from the WD, and combining the horizontal and vertical CSI sets into a combined CSI set for at least one of scheduling and beamforming.

According to this aspect, in some embodiments, each of the horizontal and vertical CSI sets include at least one of a rank indicator (RI), a channel quality indicator (CQI) and precoder matrix indicator (PMI). In some embodiments, combining the horizontal and vertical CSI sets into the combined CSI set includes selecting a maximum of rank indicators from each of the horizontal and vertical CSI sets, the RI of the horizontal CSI set being for the horizontal direction and the RI of the vertical CSI set being for the vertical direction. In some embodiments, combining the horizontal and vertical CSI sets into the combined CSI set includes combining CQI and PMI from each of the horizontal and vertical CSI sets according to combined rank. In some embodiments, the CQI from each of the horizontal and vertical CSI sets are converted to a signal to interference plus noise ratio (SINR) before combining the horizontal and vertical CSI sets. In some embodiments, the method further includes mapping a horizontal CSI-RS resource set to a row of the array, and mapping a vertical CSI-RS resource set to a column of the array, the horizontal and vertical CSI-RS resource sets being associated with the horizontal and vertical CSI sets, respectively. In some embodiments, mapping the horizontal CSI-RS resource set to a row of the array includes periodically changing the mapping of the horizontal CSI-RS resource set to a different row of the array and mapping the vertical CSI-RS resource set to a column of the array includes periodically changing the mapping of the vertical CSI-RS resource set to a different column of the array. In some embodiments, the horizontal CSI-RS resource set has a $(N_1, 1)$ codebook configuration and the vertical CSI-RS resource set has a $(N_2, 1)$ codebook configuration. In some embodiments, a number of CSI-RS ports in the horizontal direction is $2N_1$, a number of CSI-RS ports in the vertical direction is $2N_2$ and a number of combined CSI-RS ports is $2N_1N_2$. In some embodiments, a number of CSI-RS ports in the horizontal direction is equal to a number of antenna elements in the row of the array of antenna elements and a number of CSI-RS ports in the vertical direction is equal to a number of antenna elements in the column of the array of antenna elements. In some embodiments, the method further includes applying a rank restriction for the codebook configuration of at least one of the horizontal and vertical directions.

According to another aspect, a network node in communication with a wireless device (WD) is provided. The network node has an array of antenna elements and a number of channel state information reference signal (CSI-RS) ports. The network node includes processing circuitry configured to: trigger the WD to transmit in succession or simultaneously, a horizontal CSI report reporting a horizontal CSI set for a horizontal direction of the array and a vertical CSI report reporting a vertical CSI set for a vertical direction of the array, the horizontal CSI set being mapped to a row of the array and the vertical CSI set being mapped to a column of the array. The processing circuitry 68 also receives the horizontal and vertical CSI reports from the WD, and combines them into a combined CSI set for at least one of scheduling and beamforming.

According to this aspect, in some embodiments, each of the horizontal and vertical CSI sets include at least one of a rank indicator (RI), a channel quality indicator (CQI) and precoder matrix indicator (PMI). In some embodiments, combining the horizontal and vertical CSI sets into the combined CSI set includes selecting a maximum of rank indicators from each of the horizontal and vertical CSI sets, the RI of the horizontal CSI set being for the horizontal direction and the RI of the vertical CSI set being for the vertical direction. In some embodiments, combining the horizontal and vertical CSI sets into the combined CSI set includes combining CQI and PMI from each of the horizontal and vertical CSI sets according to combined rank. In some embodiments, the CQI from each of the horizontal and vertical CSI sets are converted to a signal to interference plus noise ratio (SINR) before combining the horizontal and vertical CSI-RS sets. In some embodiments, the processing circuitry is further configured to map a horizontal CSI-RS resource set to a row of the array, and mapping a vertical CSI-RS resource set to a column of the array, the horizontal and vertical CSI-RS resource sets being associated with the horizontal and vertical CSI sets, respectively. In some embodiments, mapping the horizontal CSI-RS resource set to a row of the array includes periodically changing the mapping of the horizontal CSI-RS resource set to a different row of the array and mapping the vertical CSI-RS resource set to a column of the array includes periodically changing the mapping of the vertical CSI-RS resource set to a different column of the array. In some embodiments, the horizontal CSI-RS resource set has a ($N_1$, 1) codebook configuration and the vertical CSI-RS resource set has a ($N_2$, 1) codebook configuration. In some embodiments, a number of CSI-RS ports in the horizontal direction is $2N_1$, a number of CSI-RS ports in the vertical direction is $2N_2$ and a number of combined CSI-RS ports is $2N_1N_2$. In some embodiments, a number of CSI-RS ports in the horizontal direction is equal to a number of antenna elements in the row of the array of antenna elements and a number of CSI-RS ports in the vertical direction is equal to a number of antenna elements in the column of the array of antenna elements. In some embodiments, the processing circuitry is further configured to apply a rank restriction for the codebook configuration of at least one of the horizontal and vertical directions.

According to yet another aspect, a method in a wireless device (WD) configured to communicate with a network node is provided, where the network node has an array of antenna elements and a number of channel state information reference signal (CSI-RS) ports. The method includes receiving a CSI report trigger from the network node. The method also includes generating at least one of a horizontal CSI report of a horizontal CSI set for a horizontal direction of the array and a vertical CSI report of a vertical CSI set for a vertical direction of the array. The method also includes, responsive to receiving the CSI report trigger, transmitting at least one of the horizontal CSI report and the vertical CSI report.

According to this aspect, in some embodiments, the horizontal CSI report and the vertical CSI report are transmitted in response to a single CSI report trigger. In some embodiments, the horizontal CSI report and the vertical CSI report are transmitted sequentially in response to sequential CSI report triggers. In some embodiments, each of the horizontal and vertical CSI sets include at least one of a rank indicator (RI), a channel quality indicator (CQI) and precoder matrix indicator (PMI).

According to another aspect, a WD is configured to communicate with a network node 16 having an array of antenna elements and a number of channel state information reference signal (CSI-RS) ports. The WD includes a radio interface and processing circuitry configured to receive a CSI report trigger from the network node and generate at least one of a horizontal CSI report of a horizontal CSI set for a horizontal direction of the array and a vertical CSI report of a vertical CSI set for a vertical direction of the array. Responsive to receiving the CSI report trigger, the radio interface transmits at least one of the horizontal CSI report and the vertical CSI report.

According to this aspect, in some embodiments, the horizontal CSI report and the vertical CSI report are transmitted in response to a single CSI report trigger. In some embodiments, the horizontal CSI report and the vertical CSI report are transmitted sequentially in response to sequential CSI report triggers. In some embodiments, each of the horizontal and vertical CSI sets include at least one of a rank indicator (RI), a channel quality indicator (CQI) and precoder matrix indicator (PMI).

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
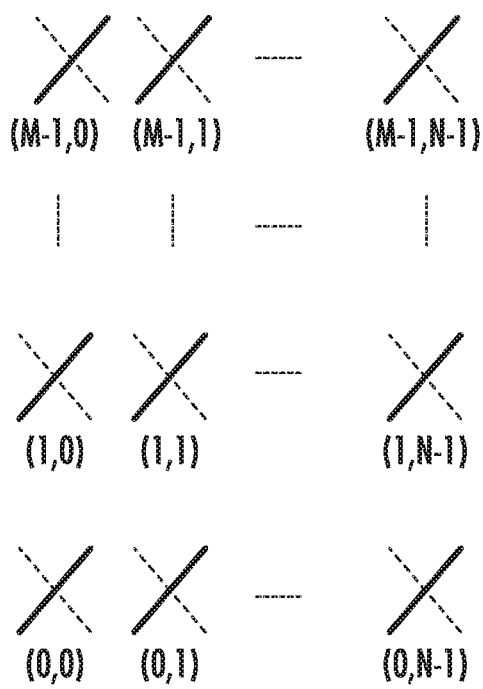
FIG. 1 is an illustration of a two dimensional cross-polarized antenna array.
Figure 2:
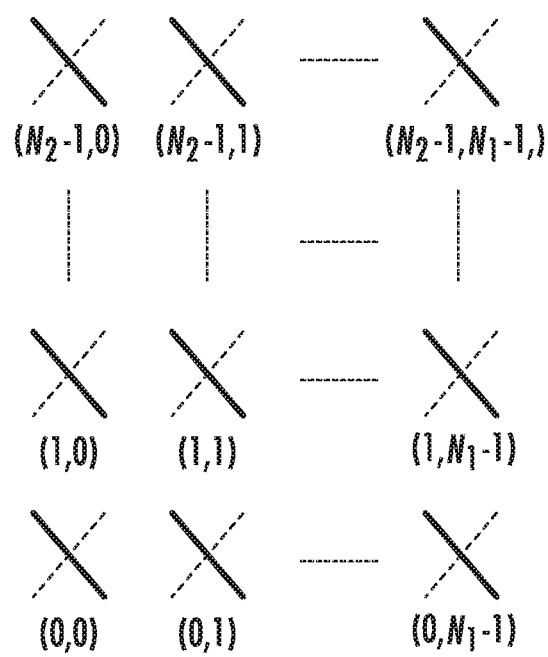
FIG. 2 is an illustration of a two dimensional cross-polarized antenna array of dimensions N1, N2.
Figure 3:
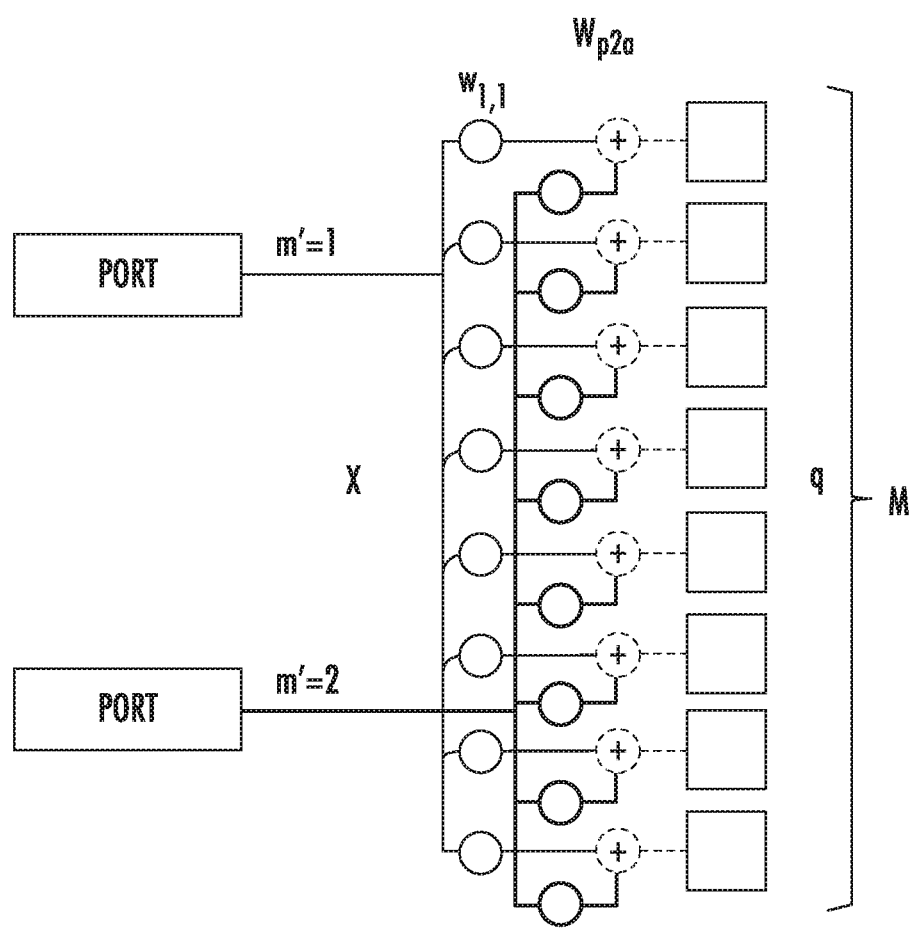
FIG. 3 is an illustration of CSI-RS port-to-antenna element mapping.
Figure 4:
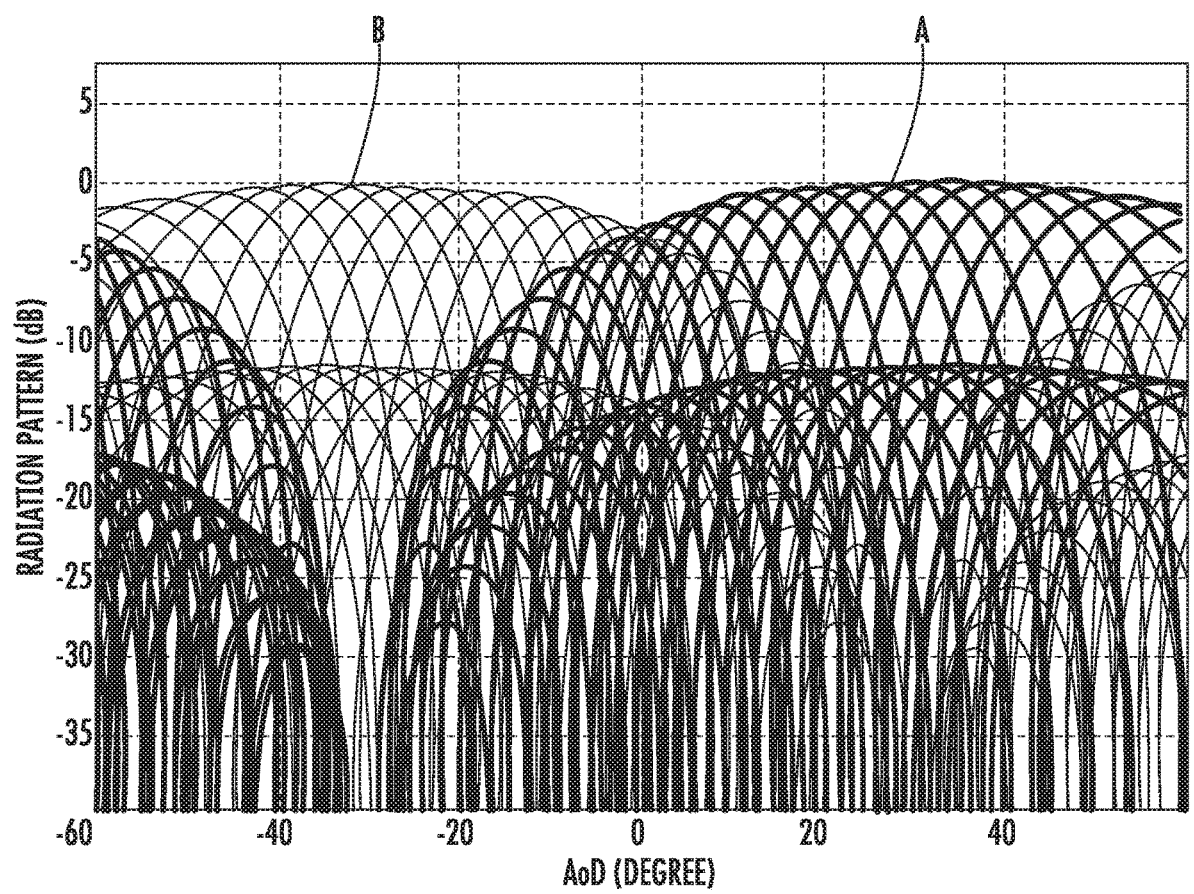
FIG. 4 is a graph of radiation patterns for first and second virtual sectors.

Before describing in detail example embodiments, it is noted that the embodiments reside primarily in combinations of apparatus components and processing steps related to dual codebook configuration and channel state information (CSI) combining for large scale active antenna systems (AAS). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In some embodiments, a method in a network node includes triggering the WD to transmit in succession or simultaneously, a horizontal CSI report reporting a horizontal CSI set for a horizontal direction of the array and a vertical CSI report reporting a vertical CSI set for a vertical direction of the array. In some embodiments, the horizontal CSI set is mapped to a row of the array and the vertical CSI set is mapped to a column of the array. The method also includes receiving the horizontal and vertical CSI reports from the WD, and combining the horizontal and vertical CSI sets into a combined CSI set for at least one of scheduling and beamforming.

Figure 5:
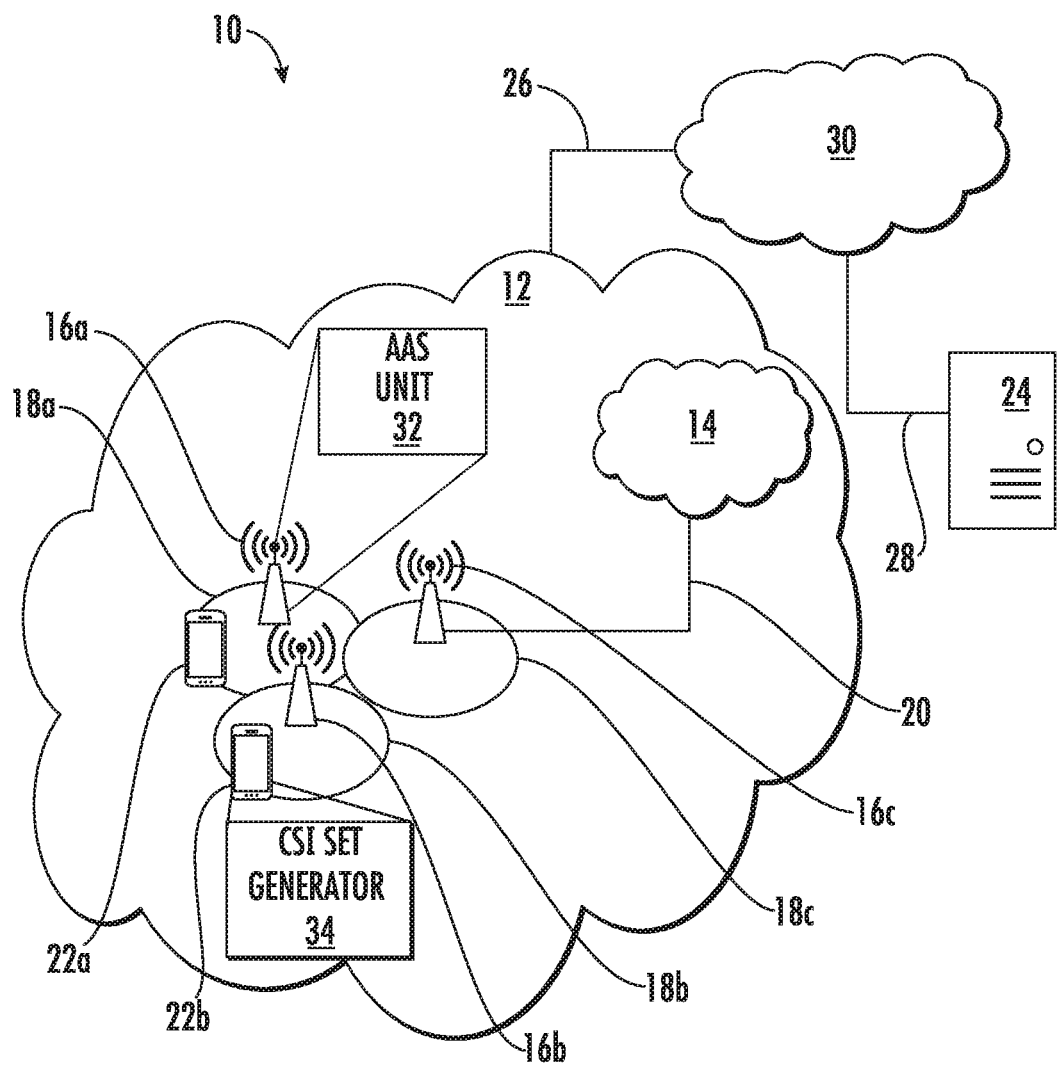
FIG. 5 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 5 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 5 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an active antenna system unit 32 which is configured to trigger the WD 22 to transmit in succession or simultaneously, a horizontal CSI report reporting a horizontal CSI set for a horizontal direction of an antenna array and a vertical CSI report reporting a vertical CSI set for a vertical direction of the antenna array. A wireless device 22 is configured to include a CSI set generator 34 which is configured to generate at least one of a horizontal CSI report of a horizontal CSI set for a horizontal direction of the antenna array and a vertical CSI report of a vertical CSI set for a vertical direction of the antenna array.

Example implementations, in accordance with an embodiment, of the WD 22, network node 16 and host computer 24 discussed in the preceding paragraphs will now be described with reference to FIG. 6. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. In addition, the radio interface 62 may include an antenna array 63 comprising an array of antenna elements that may be excited to cause beamforming. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include the active antenna system unit 32 which is configured to trigger the WD 22 to transmit in succession or simultaneously, a horizontal CSI report reporting a horizontal CSI set for a horizontal direction of an antenna array and a vertical CSI report reporting a vertical CSI set for a vertical direction of the antenna array.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a CSI set generator 34 which is configured to generate at least one of a horizontal CSI report of a horizontal CSI set for a horizontal direction of the antenna array and a vertical CSI report of a vertical CSI set for a vertical direction of the antenna array.

Figure 6:
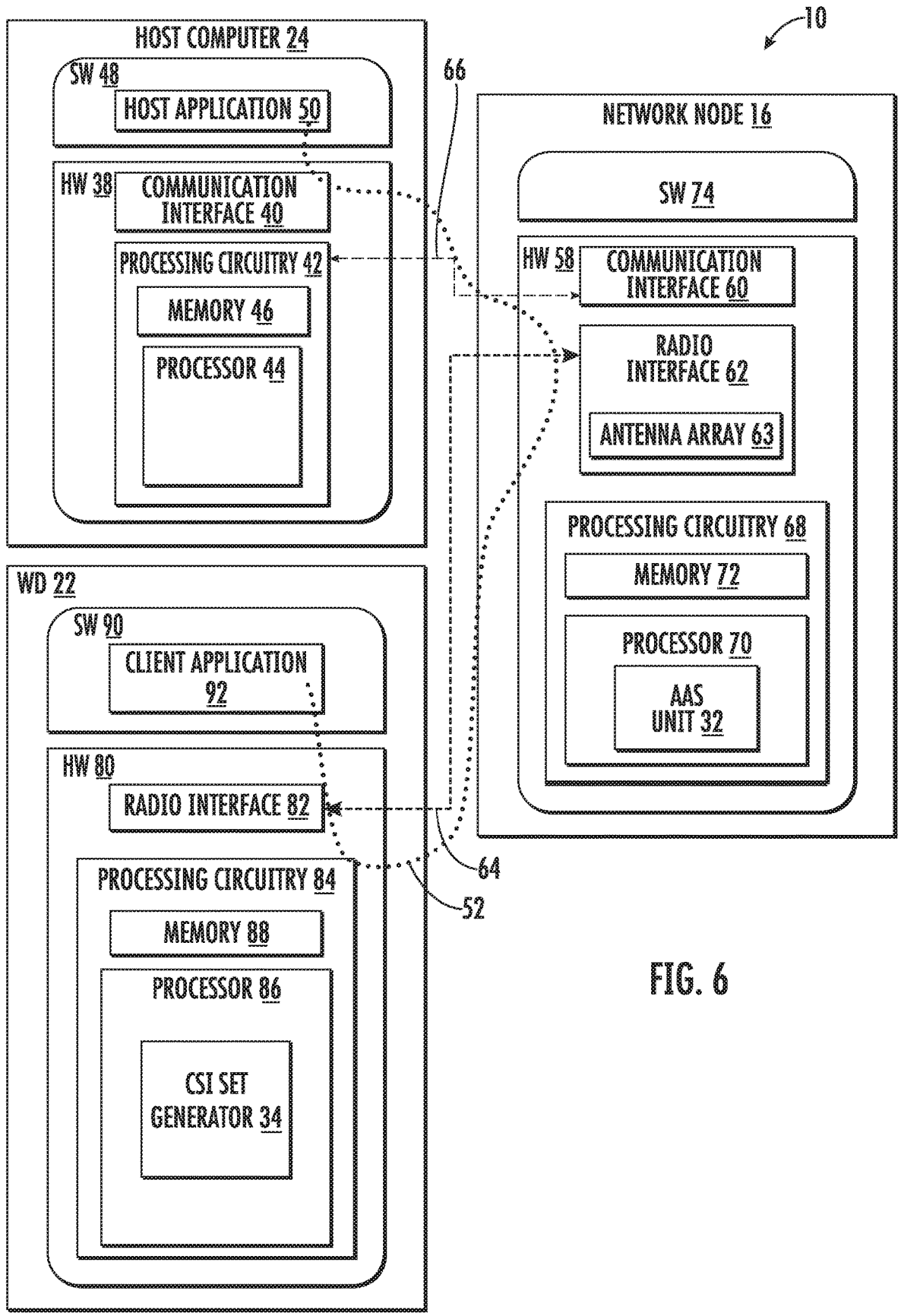
FIG. 6 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 6 and independently, the surrounding network topology may be that of FIG. 5.

In FIG. 6, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 5 and 6 show various "units" such as AAS unit 32 and CSI set generator 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 7:
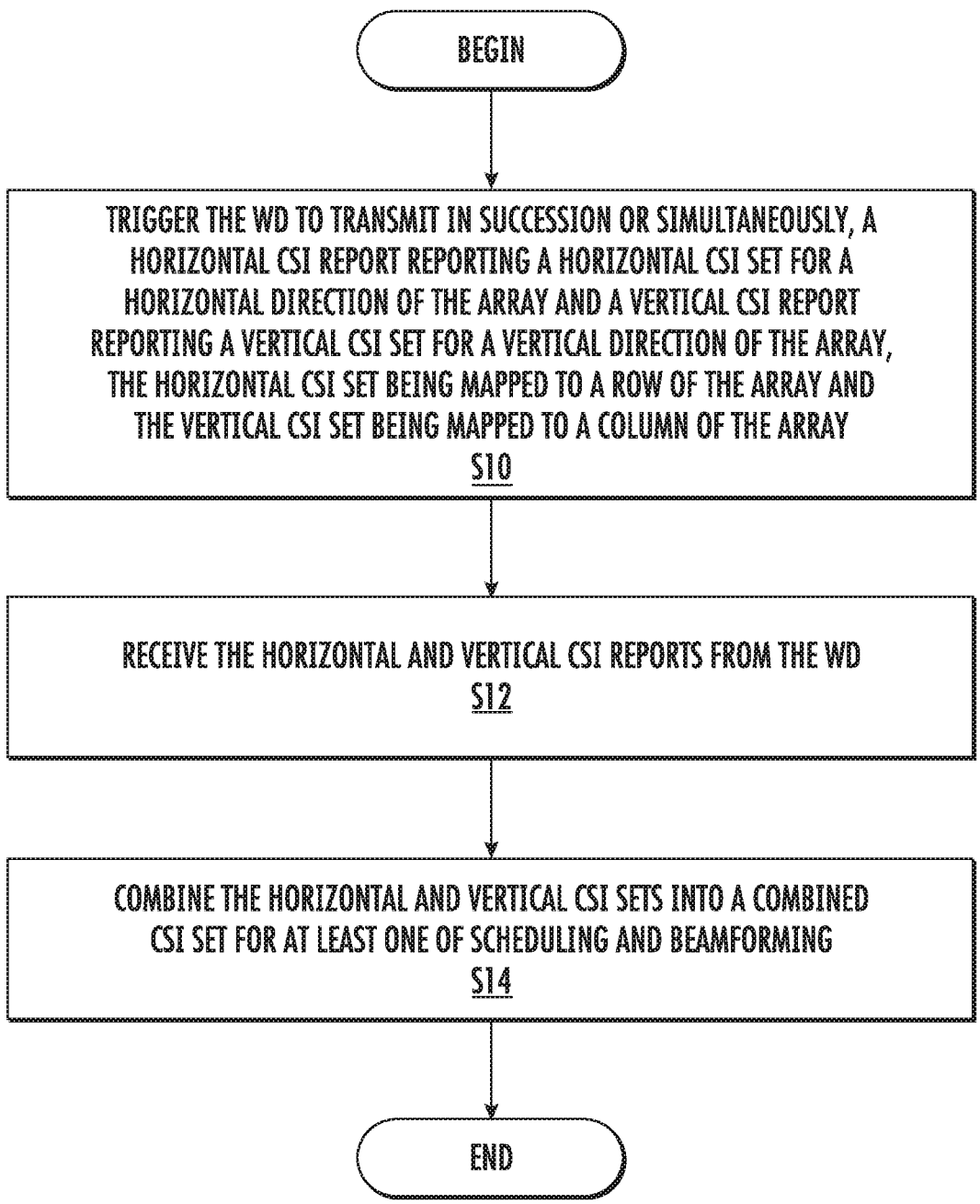
FIG. 7 is a flowchart of an example process in a network node for dual codebook configuration and channel state information (CSI) combining for large scale active antenna systems (AAS).

FIG. 7 is a flowchart of an example process in a network node 16 for dual codebook configuration and channel state information (CSI) combining for large scale active antenna systems (AAS). One or more blocks described herein may be performed by one or more elements of network node 16 such as by one or more of processing circuitry 68 (including the AAS unit 32), processor 70, radio interface 62 and/or communication interface 60. Network node 16 such as via processing circuitry 68 and/or processor 70 and/or radio interface 62 and/or communication interface 60 is configured to trigger the WD to transmit in succession or simultaneously, a horizontal CSI report reporting a horizontal CSI set for a horizontal direction of the array and a vertical CSI report reporting a vertical CSI set for a vertical direction of the array, the horizontal CSI set being mapped to a row of the array and the vertical CSI set being mapped to a column of the array (Block S10). The process also includes receiving the horizontal and vertical CSI reports from the WD (Block S12). The process further includes combining the horizontal and vertical CSI sets into a combined CSI set for at least one of scheduling and beamforming (Block S14).

Figure 8:
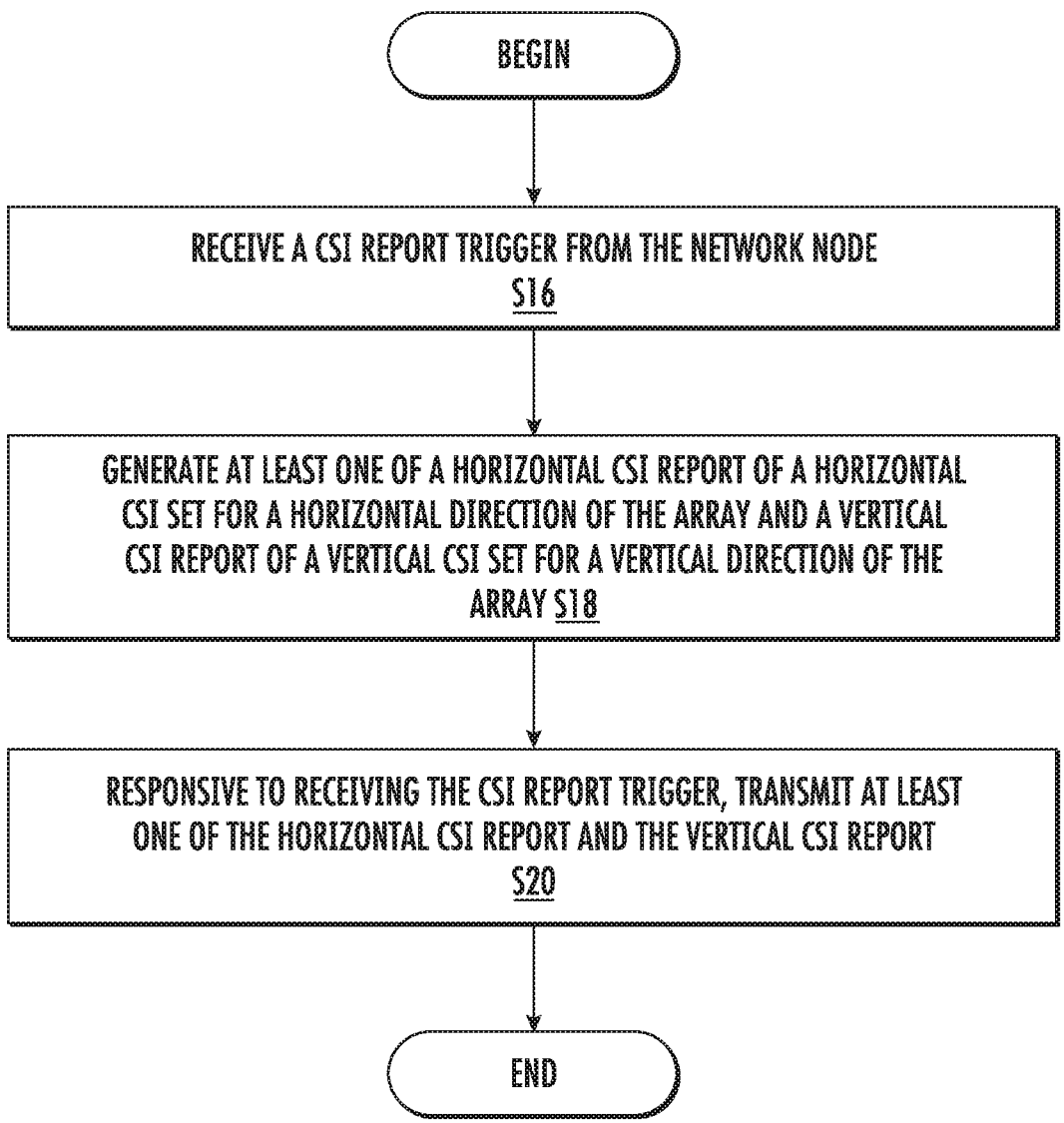
FIG. 8 is a flowchart of an example process in a wireless device for dual codebook configuration and channel state information (CSI) combining for large scale active antenna systems (AAS).

FIG. 8 is a flowchart of an example process in a wireless device 22 according to some embodiments of the present disclosure. One or more blocks described herein may be performed by one or more elements of wireless device 22 such as by one or more of processing circuitry 84 (including the CSI set generator 34), processor 86, radio interface 82 and/or communication interface 60. Wireless device 22 such as via processing circuitry 84 and/or processor 86 and/or radio interface 82 is configured to receive a CSI report trigger from the network node (Block S16). The process also includes generating at least one of a horizontal CSI report of a horizontal CSI set for a horizontal direction of the array and a vertical CSI report of a vertical CSI set for a vertical direction of the array (Block S18). The process also includes responsive to receiving the CSI report trigger, transmitting at least one of the horizontal CSI report and the vertical CSI report (Block S20).

Having described the general process flow of arrangements of the disclosure and having provided examples of hardware and software arrangements for implementing the processes and functions of the disclosure, the sections below provide details and examples of arrangements for dual codebook configuration and channel state information (CSI) combining for large scale active antenna systems (AAS).

Figure 9:
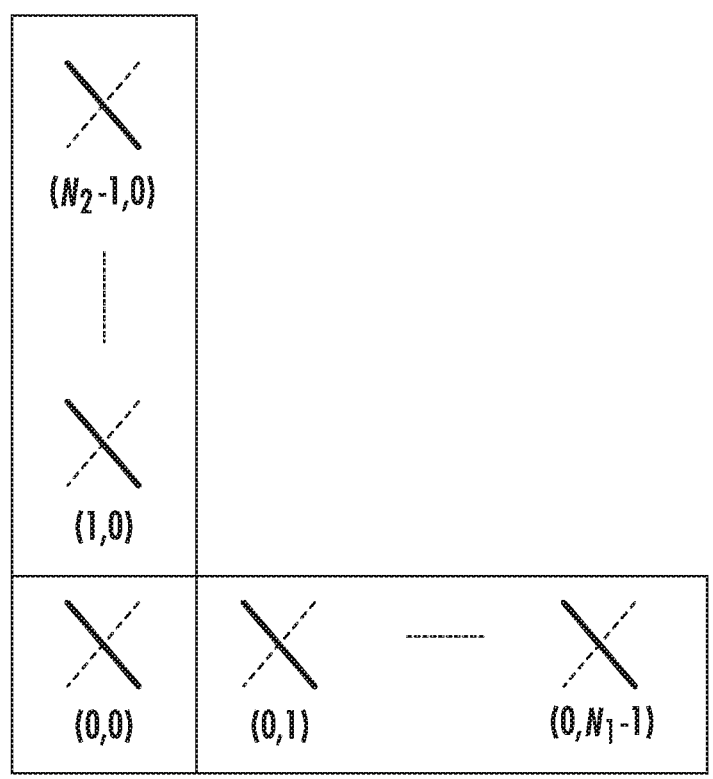
FIG. 9 is an illustration of an example row and a column of an antenna array.

Dual CSI-RS and codebook configurations may be understood with reference to FIG. 9. Two CSI-RS resource sets are configured separately for an AAS. One CSI-RS resource has a codebook configuration of $(N_1, 1)$ for the horizontal direction. Another CSI resource has a codebook configuration of $(N_2, 1)$ for the vertical direction. Thus, the number of CSI-RS ports configured in the horizontal direction $P_{CSI\_RS}^{(1)}=2N_1$. The number of CSI-RS ports configured in the vertical direction $P_{CSI\_RS}^{(2)}=2N_2$. The combined CSI-RS ports $P_{CSI\_RS}^{(1,2)}=2N_1N_2$, which is equivalent to the number of ports of the single CSI-RS resource with codebook configuration of $(N_1, N_2)$.

With current 3GPP specifications, a maximum of 32 CSI-RS ports with a codebook configuration of (16,1) is supported. By configuring two sets of 32 CSI-RS ports with codebook configuration of (16,1) in the horizontal and vertical directions, the combined number of CSI-RS ports are extended up to 512. This combination is equivalent to a single CSI-RS resource with codebook configuration of $(N_1, N_2)=(16,16)$, which is not supported by current 3GPP specifications. Thus, a large scale AAS with up to 512 antenna elements (16 rows, 16 columns and cross-polarization) can be supported with a one-to-one CSI-RS port-to-antenna mapping. If N>16 or M>16, at least one CSI-RS port may be mapped to multiple antenna elements. For example, a first number of CSI-RS ports may be mapped to a greater number of antenna elements.

Figure 10:
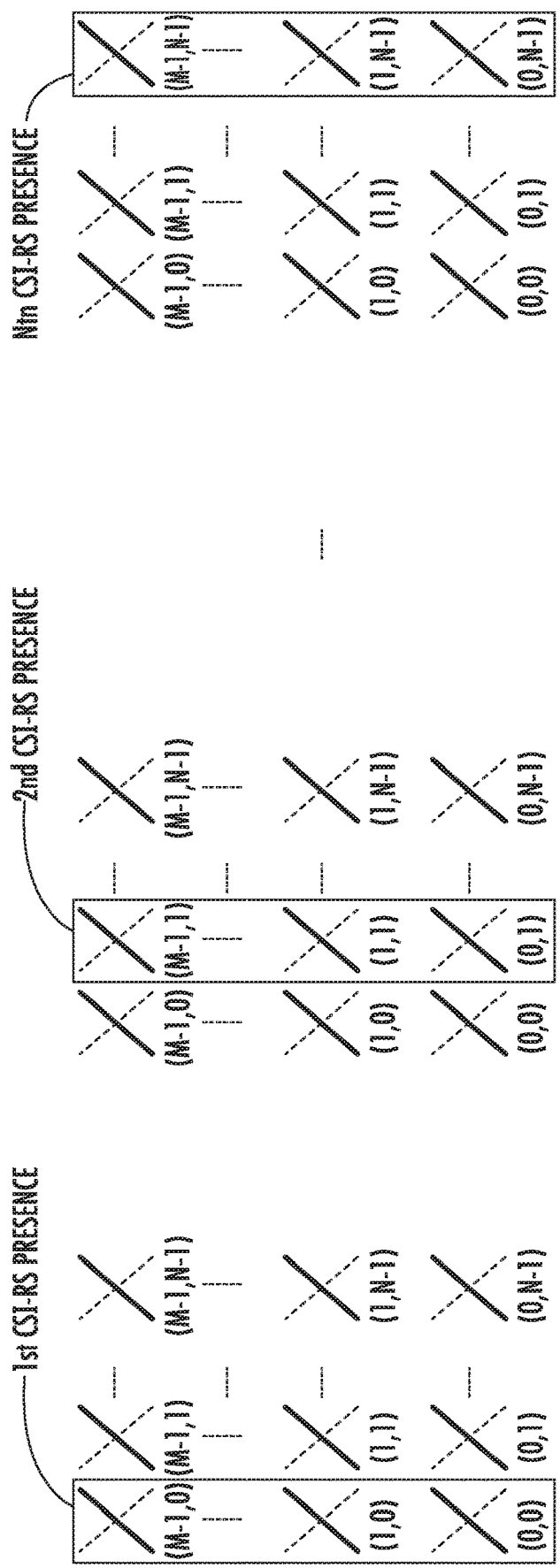
FIG. 10 is an illustration of an example of column hopping.

The CSI-RS ports for the horizontal direction may be mapped to any row of antenna elements. The CSI-RS ports for the vertical direction may be mapped to any column of antenna elements. The CSI-RS port-to-antenna mapping can be conducted static or performed dynamically. For static mapping, the CSI-RS ports are mapped to a single fixed antenna row or column persistently. In dynamic mapping, the CSI-RS port-to-antenna mapping is conducted dynamically by antenna row or antenna column hopping as shown in FIG. 10. Thus, more accurate PMI can be obtained by PMI filtering.

The rank restriction can be applied for the codebook in each direction. For example, the rank in the vertical direction can be restricted to two in order to simplify PMI combining at the network node 16.

There are at least two approaches to trigger CSI reporting of two sets of CSI-RS resources and codebook. A CSI-RS resource set and codebook may include at least one of a resource indicator (RI), a channel quality indicator (CQI) and precoder matrix indicator (PMI) for the horizontal direction and for the vertical direction. A WD may be triggered to report a CSI-RS resource set for each direction in one of at least two ways. In a first approach, both a horizontal CSI-RS resource set and a vertical CSI-RS set are triggered by a single CSI report trigger on downlink control information (DCI), so that the WD reports the CSI-RS for both directions at the same time on the physical uplink shared channel (PUSCH), for example. In a second approach, the horizontal and vertical CSI-RS resource sets can be triggered to be reported by the WD sequentially in response to two successive triggers.

For example, the first approach may be implemented by a single CSI aperiodic trigger state (CSI-AperiodicTriggerState) is configured in the CSI aperiodic trigger list (CSI-AperiodicTriggerStateList) with setting maxNrOfCSI-AperiodicTriggers=1. Two CSI associated report configuration information elements (CSI-AssociatedReportConfigInfo) are configured in a single CSI-AperiodicTriggerState with setting maxNrofReportConfigPerAperiodicTrigger=2. One CSI-AssociatedReportConfigInfo is configured with the first set of CSI-RS resources and corresponding codebook in the horizontal direction, Another CSI-AssociatedReportConfigInfo is configured with the second set of CSI-RS resources and corresponding codebook in the vertical direction. Thus, two CSI can be reported at the same time per CSI trigger through CSI request bits in DCI for PUSCH scheduling.

As an example of the second approach, two CSI aperiodic trigger states (CSI-AperiodicTriggerState) are configured in CSI aperiodic trigger list (CSI-AperiodicTriggerStateList) with setting maxNrOfCSI-AperiodicTriggers=2. One CSI associated report configuration information (CSI-AssociatedReportConfigInfo) is configured in each CSI-AperiodicTriggerState with setting maxNrofReportConfigPerAperiodicTrigger=1. One CSI-AssociatedReportConfigInfo is configured with the first set of CSI-RS resources and corresponding codebook in the horizontal direction, Another CSI-AssociatedReportConfigInfo is configured with the second set of CSI-RS resources and corresponding codebook in the vertical direction. Horizontal and vertical CSI reports may be triggered to be reported alternately via CSI request bits in DCI for PUSCH scheduling.

At the network node 16, two sets of channel state information (CSI), which may include, for example RI, CQI and PMI, may be received at the same time or sequentially. There is one set for each direction. The first CSI resource set for the horizontal CSI-RS resource and codebook may include:

$RI^{(1)}$—Rank indication of horizontal direction. Assume $1 \geq RI^{(1)} \leq 4$ without rank restriction;
$CQI^{(1)}$—CQI of horizontal direction; and/or
$PMI^{(1)}$-$(i_{1,1}^{(1)}, i_{1,2}^{(1)}, i_{1,3}^{(1)}, i_2^{(1)})$—PMI of horizontal direction.

The second CSI set for the vertical CSI-RS resource and codebook may include:

$RI^{(2)}$—Rank indication of vertical direction. Assume $RI^{(2)} \leq 2$ with rank restriction in vertical direction;
$CQI^{(2)}$—CQI of vertical direction; and/or
$PMI^{(2)}$-$(i_{1,1}^{(2)}, i_{1,2}^{(2)}, i_{1,3}^{(2)}, i_2^{(2)})$—PMI of vertical direction.

Due to there being a single-dimensional CSI-RS configuration in each direction, $i_{1,2}^{(1)}$ and $i_{1,2}^{(2)}$ will be always zero.

The two set of CSI received from the WD 22 may be combined into a single CSI for scheduling. One example of CSI combining is described as follows:

Select RI=max ($RI^{(1)}$, $RI^{(2)}$);
CQI and PMI are combined according to combined rank; and
CQI is combined in the signal to interference plus noise ratio (SINR) domain, expressed by
if $RI = RI^{(1)}$
$SINR = CQI2SINR(CQI^{(1)}) + 10 \times \log 10(N_2)$
$(i_{1,1}, i_{1,2}, i_{1,3}, i_2) = (i_{1,1}^{(1)}, i_{1,1}^{(2)}, i_{1,3}^{(1)}, i_2^{(1)})$
Else if $RI = RI^{(2)}$
$SINR = CQI2SINR(CQI^{(2)}) + 10 \times \log 10(N_1)$
$(i_{1,1}, i_{1,2}, i_{1,3}, i_2) = (i_{1,1}^{(1)}, i_{1,1}^{(2)}, i_{1,3}^{(2)}, i_2^{(2)})$ where CQI2SINR is a mapping function that converts CQI to SINR in db. After combining the horizontal and vertical CSI sets into a single CSI for scheduling, beamforming weights for downlink transmission may be generated based on the combined RI and PMI.

If $RI \leq 2$ OR $P_{CSI\_RS}^{(1)} < 16$, then the beamforming weights are generated as described above for a full antenna ports codebook. Otherwise, the beamforming weights are generated as described above for an antenna ports grouping codebook.

According to one aspect, a method in a network node 16 in communication with a wireless device (WD) 22 is provided. The network node 16 has an array of antenna elements and a number of channel state information reference signal (CSI-RS) ports. The method includes triggering the WD 22 to transmit in succession or simultaneously, a horizontal CSI report reporting a horizontal CSI set for a horizontal direction of the array and a vertical CSI report reporting a vertical CSI set for a vertical direction of the array, the horizontal CSI set being mapped to a row of the array and the vertical CSI set being mapped to a column of the array. The method also includes receiving the horizontal and vertical CSI reports from the WD 22, and combining the horizontal and vertical CSI sets into a combined CSI set for at least one of scheduling and beamforming.

According to this aspect, in some embodiments, each of the horizontal and vertical CSI sets include at least one of a rank indicator (RI), a channel quality indicator (CQI) and precoder matrix indicator (PMI). In some embodiments, combining the horizontal and vertical CSI sets into the combined CSI set includes selecting a maximum of rank indicators from each of the horizontal and vertical CSI sets, the RI of the horizontal CSI set being for the horizontal direction and the RI of the vertical CSI set being for the vertical direction. In some embodiments, combining the horizontal and vertical CSI sets into the combined CSI set includes combining CQI and PMI from each of the horizontal and vertical CSI sets according to combined rank. In some embodiments, the CQI from each of the horizontal and vertical CSI sets are converted to a signal to interference plus noise ratio (SINR) before combining the horizontal and vertical CSI sets. In some embodiments, the method further includes mapping a horizontal CSI-RS resource set to a row of the array, and mapping a vertical CSI-RS resource set to a column of the array, the horizontal and vertical CSI-RS resource sets being associated with the horizontal and vertical CSI sets, respectively. In some embodiments, mapping the horizontal CSI resource set to a row of the array includes periodically changing the mapping of the horizontal CSI set to a different row of the array and mapping the vertical CSI set to a column of the array includes periodically changing the mapping of the vertical CSI set to a different column of the array. In some embodiments, the horizontal CSI-RS resource set has a ($N_1$, 1) codebook configuration and the vertical CSI-RS resource set has a ($N_2$, 1) codebook configuration. In some embodiments, a number of CSI-RS ports in the horizontal direction is $2N_1$, a number of CSI-RS ports in the vertical direction is $2N_2$ and a number of combined CSI-RS ports is $2N_1N_2$. In some embodiments, a number of CSI-RS ports in the horizontal direction is equal to a number of antenna elements in the row of the array of antenna elements and a number of CSI-RS ports in the vertical direction is equal to a number of antenna elements in the column of the array of antenna elements.

According to another aspect, a network node 16 in communication with a wireless device (WD) 22 is provided. The network node 16 has an array of antenna elements and a number of channel state information reference signal (CSI-RS) ports. The network node 16 includes processing circuitry 68 configured to: trigger the WD 22 to transmit in succession or simultaneously, a horizontal CSI report reporting a horizontal CSI set for a horizontal direction of the array and a vertical CSI report reporting a vertical CSI set for a vertical direction of the array, the horizontal CSI set being mapped to a row of the array and the vertical CSI set being mapped to a column of the array. The processing circuitry 68 also receives the horizontal and vertical CSI reports from the WD 22, and combines them into a combined CSI set for at least one of scheduling and beamforming.

According to this aspect, in some embodiments, each of the horizontal and vertical CSI sets include at least one of a rank indicator (RI), a channel quality indicator (CQI) and precoder matrix indicator (PMI). In some embodiments, combining the horizontal and vertical CSI sets into the combined CSI set includes selecting a maximum of rank indicators from each of the horizontal and vertical CSI sets, the RI of the horizontal CSI set being for the horizontal direction and the RI of the vertical CSI set being for the vertical direction. In some embodiments, combining the horizontal and vertical CSI sets into the combined CSI set includes combining CQI and PMI from each of the horizontal and vertical CSI sets according to combined rank. In some embodiments, the CQI from each of the horizontal and vertical CSI sets are converted to a signal to interference plus noise ratio (SINR) before combining the horizontal and vertical CSI sets. In some embodiments, the processing circuitry 68 is further configured to map a horizontal CSI-RS resource set to a row of the array, and mapping a vertical CSI-RS resource set to a column of the array, the horizontal and vertical CSI-RS resource sets being associated with the horizontal and vertical CSI sets, respectively. In some embodiments, mapping the horizontal CSI resource set to a row of the array includes periodically changing the mapping of the horizontal CSI-RS resource set to a different row of the array and mapping the vertical CSI-RS resource set to a column of the array includes periodically changing the mapping of the vertical CSI-RS resource set to a different column of the array. In some embodiments, the horizontal CSI-rs resource set has a ($N_1$, 1) codebook configuration and the vertical CSI-RS resource set has a ($N_2$, 1) codebook configuration. In some embodiments, a number of CSI-RS ports in the horizontal direction is $2N_1$, a number of CSI-RS ports in the vertical direction is $2N_2$ and a number of combined CSI-RS ports is $2N_1N_2$. In some embodiments, a number of CSI-RS ports in the horizontal direction is equal to a number of antenna elements in the row of the array of antenna elements and a number of CSI-RS ports in the vertical direction is equal to a number of antenna elements in the column of the array of antenna elements.

According to yet another aspect, a method in a wireless device (WD) 22 configured to communicate with a network node 16 is provided, where the network node 16 has an array of antenna elements and a number of channel state information reference signal (CSI-RS) ports. The method includes receiving a CSI report trigger from the network node 16. The method also includes generating at least one of a horizontal CSI report of a horizontal CSI set for a horizontal direction of the array and a vertical CSI report of a vertical CSI set for a vertical direction of the array. The method also includes, responsive to receiving the CSI report trigger, transmitting at least one of the horizontal CSI report and the vertical CSI report.

According to this aspect, in some embodiments, the horizontal CSI report and the vertical CSI report are transmitted in response to a single CSI report trigger. In some embodiments, the horizontal CSI report and the vertical CSI report are transmitted sequentially in response to sequential CSI report triggers. In some embodiments, each of the horizontal and vertical CSI sets include at least one of a rank indicator (RI), a channel quality indicator (CQI) and precoder matrix indicator (PMI).

According to another aspect, a WD 22 is configured to communicate with a network node 16 having an array of antenna elements and a number of channel state information reference signal (CSI-RS) ports. The WD 22 includes a radio interface 82 and processing circuitry 84 configured to receive a CSI report trigger from the network node 16 and generate at least one of a horizontal CSI report of a horizontal CSI set for a horizontal direction of the array and a vertical CSI report of a vertical CSI set for a vertical direction of the array. Responsive to receiving the CSI report trigger, the radio interface transmits at least one of the horizontal CSI report and the vertical CSI report.

According to this aspect, in some embodiments, the horizontal CSI report and the vertical CSI report are transmitted in response to a single CSI report trigger. In some embodiments, the horizontal CSI report and the vertical CSI report are transmitted sequentially in response to sequential CSI report triggers. In some embodiments, each of the horizontal and vertical CSI sets include at least one of a rank indicator (RI), a channel quality indicator (CQI) and precoder matrix indicator (PMI).

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Some abbreviations used above may include:

| Abbreviation | Explanation |
| --- | --- |
| AAS | Active Antenna System |
| CQI | Channel Quality Indicator |
| CSI | Channel State Information |
| CSI-RS | Channel State Information Reference Signal |
| DFT | Discrete Fourier Transform |
| FD-MIMO | Full Dimension MIMO |
| NZP | None-Zero Power |
| PMI | Precoding Matrix Indicator |
| RE | Resource Element |
| RI | Rank Indicator |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node in communication with a wireless device, WD, the network node having an array of antenna elements and a number of channel state information reference signal (CSI-RS) ports, the method comprising:
triggering the WD to transmit in succession or simultaneously, a horizontal CSI report reporting a horizontal CSI set for a horizontal direction of the array and a vertical CSI report reporting a vertical CSI set for a vertical direction of the array, the horizontal CSI set being mapped to a row of the array and the vertical CSI set being mapped to a column of the array, the horizontal CSI set corresponding to a horizontal CSI-RS resource set having a $(N_1,1)$ codebook configuration and the vertical CSI set corresponding to a vertical CSI-RS resource set having a $(N_2, 1)$ codebook configuration, a number of CSI-RS ports in the horizontal direction being $2N_1$, a number of CSI-RS ports in the vertical direction being $2N_2$ and a number of combined CSI-RS ports being $2N_2N_1$;
receiving the horizontal and vertical CSI reports from the WD; and
combining the horizontal and vertical [CSI sets into a combined CSI set for at least one of scheduling and beamforming.

2. The method of claim 1, wherein each of the horizontal and vertical CSI sets include at least one of a rank indicator (RI), a channel quality indicator (CQI) and precoder matrix indicator (PMI).

3. The method of claim 2, wherein combining the horizontal and vertical CSI sets into the combined CSI set includes selecting a maximum of rank indicators from each of the horizontal and vertical CSI sets, the RI of the horizontal CSI set being for the horizontal direction and the RI of the vertical CSI set being for the vertical direction.

4. The method of claim 3, wherein combining the horizontal and vertical CSI sets into the combined CSI set includes combining CQI and PMI from each of the horizontal and vertical CSI sets according to combined rank.

5. The method of claim 4, wherein the CQI from each of the horizontal and vertical CSI sets are converted to a signal to interference plus noise ratio (SINR) before combining the horizontal and vertical CSI sets.

6. The method of claim 1, further comprising mapping a horizontal CSI-RS resource set to a row of the array, and mapping a vertical CSI-RS resource set to a column of the array, the horizontal and vertical CSI-RS resource sets being associated with the horizontal and vertical CSI sets, respectively.

7. The method of claim 6, wherein mapping the horizontal CSI-RS resource set to a row of the array includes periodically changing the mapping of the horizontal CSI-RS resource set to a different row of the array and mapping the vertical CSI-RS resource set to a column of the array includes periodically changing the mapping of the vertical CSI-RS resource set to a different column of the array.

8. The method of claim 1 wherein a number of CSI-RS ports in the horizontal direction is equal to a number of antenna elements in the row of the array of antenna elements and a number of CSI-RS ports in the vertical direction is equal to a number of antenna elements in the column of the array of antenna elements.

9. The method of claim 1, further comprising applying a rank restriction for a codebook configuration of at least one of the horizontal and vertical directions.

10. A network node in communication with a wireless device, WD, the network node having an array of antenna elements and a number of channel state information reference signal (CSI-RS) ports, the network node comprising processing circuitry configured to:
trigger the WD to transmit in succession or simultaneously, a horizontal CSI report reporting a horizontal CSI set for a horizontal direction of the array and a vertical CSI report reporting a vertical CSI set for a vertical direction of the array, the horizontal CSI set being mapped to a row of the array and the vertical CSI set being mapped to a column of the array, the horizontal CSI set corresponding to a horizontal CSI-RS resource set having a $(N_1,1)$ codebook configuration and the vertical CSI set corresponding to a vertical CSI-RS resource set having a $(N_2,1)$ codebook configuration, a number of CSI-RS ports in the horizontal direction being $2N_1$, a number of CSI-RS ports in the vertical direction being $2N_2$ and a number of combined CSI-RS ports being $2N_2N_1$;
receive the horizontal and vertical CSI reports from the WD; and
combine the horizontal and vertical CSI sets into a combined CSI set for at least one of scheduling and beamforming.

11. The network node of claim 10, wherein each of the horizontal and vertical CSI sets include at least one of a rank indicator (RI), a channel quality indicator (CQI) and precoder matrix indicator (PMI).

12. The network node of claim 11, wherein combining the horizontal and vertical CSI sets into the combined CSI set includes selecting a maximum of rank indicators from each of the horizontal and vertical CSI sets, the RI of the horizontal CSI set being for the horizontal direction and the RI of the vertical CSI set being for the vertical direction.

13. The network node of claim 12, wherein combining the horizontal and vertical CSI sets into the combined CSI set includes combining CQI and PMI from each of the horizontal and vertical CSI sets according to combined rank.

14. The network node of claim 13, wherein the CQI from each of the horizontal and vertical CSI sets are converted to a signal to interference plus noise ratio (SINR) before combining the horizontal and vertical CSI sets.

15. The network node of claim 10, further comprising mapping a horizontal CSI-RS resource set to a row of the array, and mapping a vertical CSI-RS resource set to a column of the array, the horizontal and vertical CSI-RS resource sets being associated with the horizontal and vertical CSI sets, respectively.

16. The network node of claim 10, wherein mapping the horizontal CSI set to a row of the array includes periodically changing the mapping of the horizontal CSI resource set to a different row of the array and mapping the vertical CSI set to a column of the array includes periodically changing the mapping of the vertical CSI resource set to a different column of the array.

17. The network node of claim 10, wherein a number of CSI-RS ports in the horizontal direction is equal to a number of antenna elements in the row of the array of antenna elements and a number of CSI-RS ports in the vertical direction is equal to a number of antenna elements in the column of the array of antenna elements.

18. The network node of claim 10, wherein the processing circuitry is further configured to apply a rank restriction for a codebook configuration of at least one of the horizontal and vertical directions.

19. A method in a wireless device, WD, configured to communicate with a network node having an array of antenna elements and a number of channel state information reference signal (CSI-RS) ports, the method comprising:
receiving a CSI report trigger from the network node;
generating at least one of a horizontal CSI report of a horizontal CSI set for a horizontal direction of the array and a vertical CSI report of a vertical CSI set for a vertical direction of the array, the horizontal CSI set corresponding to a horizontal CSI-RS resource set having a $(N_1,1)$ codebook configuration and the vertical CSI set corresponding to a vertical CSI-RS resource set having a $(N_2,1)$ codebook configuration, a number of CSI-RS ports in the horizontal direction being $2N_1$, a number of CSI-RS ports in the vertical direction being $2N_2$ and a number of combined CSI-RS ports being $2N_2N_1$; and
responsive to receiving the CSI report trigger, transmitting at least one of the horizontal CSI report and the vertical CSI report.

20. The method of claim 19, wherein the horizontal CSI report and the vertical CSI report are transmitted in response to a single CSI report trigger.

21. The method of claim 19, wherein the horizontal CSI report and the vertical CSI report are transmitted sequentially in response to sequential CSI report triggers.

22. The method of claim 19, wherein each of the horizontal and vertical CSI sets include at least one of a rank indicator (RI), a channel quality indicator (CQI) and precoder matrix indicator (PMI).

23. A wireless device, WD, configured to communicate with a network node having an array of antenna elements and a number of channel state information reference signal (CSI-RS) ports, the WD including a radio interface and processing circuitry configured to:
receive a CSI report trigger from the network node;
generate at least one of a horizontal CSI report of a horizontal CSI set for a horizontal direction of the array and a vertical CSI report of a vertical CSI set for a vertical direction of the array, the horizontal CSI set corresponding to a horizontal CSI-RS resource set having a $(N_1,1)$ codebook configuration and the vertical CSI set corresponding to a vertical CSI-RS resource set having a $(N_2, 1)$ codebook configuration, a number of CSI-RS ports in the horizontal direction being $2N_1$, a number of CSI-RS ports in the vertical direction being $2N_2$ and a number of combined CSI-RS ports being $2N_2N_1$; and responsive to receiving the CSI report trigger, transmit at least one of the horizontal CSI report and the vertical CSI report.

24. The WD of claim 23, wherein the horizontal CSI report and the vertical CSI report are transmitted in response to a single CSI report trigger.

25. The WD of claim 23, wherein the horizontal CSI report and the vertical CSI report are transmitted sequentially in response to sequential CSI report triggers.

26. The WD of claim 23, wherein each of the horizontal and vertical CSI sets include at least one of a rank indicator (RI), a channel quality indicator (CQI) and precoder matrix indicator (PMI).

* * * * *